United States Patent Office 2,867,669
Patented Jan. 6, 1959

2,867,669

METHOD OF FORMING MONONITRO HYDROCARBONS

Charles A Burkhard, Alplaus, and John F. Brown, Jr., Schenectady, N. Y., assignors to General Electric Company, a corporation of New York No Drawing. Application August 19, 1954
Serial No. 451,066

9 Claims. (Cl. 260—644)

This application is a continuation-in-part of our application Serial No. 282,082, now abandoned, filed April 12, 1952, and assigned to the same assignee as the present invention.

This invention relates to a method of forming mononitro hydrocarbons. More particularly, this invention is concerned with the method of forming mononitro derivatives of hydrocarbon compounds by the reaction of hydrocarbon compounds with nitric oxide. Specifically, this invention relates to the reaction between hydrocarbon compounds and nitric oxide in the presence of a catalytic quantity of a substance which will yield nitrogen dioxide in an atmosphere of nitric oxide.

The terms "mononitro hydrocarbons" and "mononitro derivatives of hydrocarbons" as used in the present application mean hydrocarbons containing only one nitro group ($-NO_2$) linked to carbon through a carbon-nitrogen linkage and containing no other inorganic groups attached to a carbon atom. Thus 1-nitro-1-pentene is a mononitro hydrocarbon within the above definition, while 1-nitro-2-nitroso pentane does not fall within the above definition because of the presence of the nitroso group.

Heretofore, hydrocarbon compounds have been nitrated by a number of methods. For example, the commercial method of preparation of nitroparaffins consists of the direct reaction of a paraffin with nitric acid at temperatures of 350° to 450° C. In this reaction, the carbon structure is cleaved, making it possible to obtain nitromethane and nitroethane from ethane or propane. In preparing nitro olefins, it is necessary, but presently known commercial methods, to react either an aldehyde or ketone with a nitroparaffin in the presence of a basic catalyst. The nitroalcohol that results from this reaction is then esterified with acetic anhydride to form the nitroacetate. The nitroacetate is then decomposed either in the presence of a base such as sodium carbonate, or by thermal means to form the nitro olefin. The above series of reactions gives a low yield of nitro olefins. Another method of nitrating olefins has been to react the olefin with nitric oxide in the presence of a substantial amount of nitrogen dioxide or a substance which will yield nitrogen dioxide in an atmosphere of nitric oxide. In general, this reaction has been carried out by reacting the olefin with nitrogen trioxide ($N_2O_3$) which dissociates into equimolar parts of nitric oxide and nitrogen dioxide. However, this reaction does not produce any significant yield of mononitro olefins but instead produces primarily monomeric or dimeric nitrosites, dinitro compounds, nitroalcohols, or nitro nitrates. It is also known that one can react olefinic compounds with a mixture of nitric oxide and nitrogen trioxide, but again the products of the reaction are the nitrosites, dinitro compounds, nitroalcohols, and nitro nitrates.

We have discovered that mononitro derivatives of hydrocarbon compounds may be formed by effecting reaction between a hydrocarbon and nitric oxide in the presence of catalytic amounts of nitrogen dioxide or a substance which will yield nitrogen dioxide in an atmosphere of nitric oxide. By catalytic amounts, we mean amounts which vary from a trace up to about 2 percent, by weight, of the substance which yields nitrogen dioxide in an atmosphere of nitric oxide.

Although it has been suggested that mononitro derivatives of hydrocarbon compounds may be formed by effecting reaction between the hydrocarbon and nitric oxide, we have found that no such reaction takes place when nitric oxide and a hydrocarbon compound are mixed together, regardless of the conditions under which the reaction is attempted.

We believe that there are two types of reactions which take place when hydrocarbons are mixed with nitric oxide and nitrogen dioxide or a substance which yields nitrogen dioxide in the presence of nitric oxide. The net effect of the first type of reaction is to form monomeric or dimeric nitrosites, dinitro compounds, nitroalcohols and nitro nitrates. The net effect of the second type of reaction is to produce mononitro derivatives of the hydrocarbons. We have found that when employing substantial amounts of nitrogen dioxide or a substance which yields nitrogen dioxide in an atmosphere of nitric oxide, the first type of action is dominant so that the primary reaction products are the monomeric or dimeric nitrosites, dinitro compounds, nitro alcohols and nitro nitrates. When only catalytic amounts, i. e., from a trace up to 2 percent, by weight, of nitrogen dioxide or a substance which yields nitrogen dioxide in an atmosphere of nitric oxide are present in the reaction system the second type of reaction is dominant so that good yields of mononitro hydrocarbons are obtained.

The method of the present invention has been found to be applicable to all types of hydrocarbons. That is, the reaction may be effected using linear, branched-chain, or cyclic saturated aliphatic hydrocarbons; linear, branched-chain, or cyclic olefinically unsaturated aliphatic hydrocarbons; aromatic hydrocarbons, and aromatic substituted aliphatic hydrocarbons.

Among the substances which yield nitrogen dioxide in an atmosphere of nitric oxide are included, for example, nitrogen oxy-acids, and the oxides of nitrogen other than nitrous oxide and nitric oxide. These oxides of nitrogen include nitrogen trioxide ($N_2O_3$), nitrogen tetroxide ($N_2O_4$) and nitrogen pentoxide ($N_2O_5$). Among the nitrogen oxy-acids which yield nitrogen dioxide in an atmosphere of nitric oxide are nitrous acid and nitric acid. Nitrous oxide ($N_2O$) is not suitable for the purposes of the present invention as a catalytic material since nitrous oxide will not yield nitrogen dioxide in an atmosphere of nitric oxide.

Our method of forming mononitro derivatives of hydrocarbons has a very broad application within the field. It is particularly applicable to olefins as it constitutes a single-stage process for forming mononitro derivatives of olefins. Nitration reactions carried out in accordance with our invention are not limited as to temperature or pressure except to the extent that optimum conditions may be established for any particular compound being nitrated. The rate of the reaction is not the same for all compounds. Some compounds are so reactive that the reaction must be carried out at a temperature considerably below room temperature in order to avoid overheating and the production of undesired side products. Other compounds are comparatively inert and the reaction rate is advantageously increased by the application of heat. Many compounds react with nitric oxide in the presence of nitrogen dioxide or a substance which yields nitrogen dioxide in an atmosphere of nitric oxide quite rapidly at atmospheric pressure or at pressures even less than atmospheric pressure. While in the case of other hydrocarbon compounds it is desirable to carry out the reaction in an autoclave under pressures of the order of several hundred pounds per square inch, depending on the particular hydrocarbon compound being nitrated, the reaction of the present invention may be carried out in the liquid phase or in the vapor phase. When carrying out the reaction in the liquid phase the reaction may be effected in the presence of or in the absence of suitable solvents.

The mononitro hydrocarbon compounds prepared by the method of the present invention are useful as fungicides, insecticides, dyestuffs, pharmaceuticals, and intermediates in the preparation of explosive materials.

The following examples are illustrative of the practice of our invention and are not intended for purposes of limitation.

EXAMPLE 1

*The reaction of 1-pentene with nitric oxide*

1-pentene (100 grams) was charged into a 300 ml. glass-lined autoclave. The autoclave was flushed with nitrogen three times. Nitric oxide in which about 0.01% by weight of nitrogen dioxide was incorporated was then added to the autoclave to a pressure of 320 p. s. i. g., and the reaction began immediately. Further additions of nitric oxide were made at intervals over a period of about two hours. Prior to each addition, the reaction gases were vented. The rocking mechanism on the autoclave was running during the reaction. A two-phase reaction product (112 grams) was obtained. The 1-pentene was removed on a vacuum train, 55.5 grams of 1-pentene being recovered, and a crystalline solid separated. This solid was filtered off and recrystallized from ether; M. P. 86° C. The crystalline solid was found to be the dimeric pentene nitrosite, specifically 1-nitro-2-nitrosopentane dimer, on the basis of the following facts: (1) The molecular formula is $(C_5H_{10}N_2O_3)_2$. (Anal. calcd. for $C_{10}H_{20}N_4O_6$: C, 41.09%; H, 6.90%; mol. wt. 292. Found: C, 41.0%; H, 6.9%; mol. wt. 275 (using benzene as the cryoscopic solvent)). (2) Upon heating, the compound was transformed reversibly into a deep blue liquid. The ultraviolet absorption spectrum of the compound showed a maximum at 294 m$\mu$. (3) The infrared spectrum showed an unconjugated nitro group to be present. (4) It gave a red color in the "red, white, and blue test," indicating the presence of a primary nitro group. (5) When refluxed with dilute sulfuric acid, it was cleaved, apparently quantitatively, to hydroxylamine (85 percent of total nitrogen), formic acid, and butyric acid (p-phenylphenacyl ester, M. P. 81–2° C.). (6) Catalytic hydrogenation over platinum in alcohol yielded n-valeraldehyde; 2,4-dinitrophenylhydrazone M. P. 105–106° C. (7) When the compound was heated for a few minutes at 130–140° C., the blue color gradually disappeared. Upon steam distillation of the resulting yellow-orange liquid, about half distilled over and was collected as a pale yellow liquid. Most of this liquid polymerized on redistillation, but a 0.1 ml. fraction (B. P. ca. 80° C./19 mm., $n_D^{20}$ 1.4562) was collected. This distillate had the odor of 1-nitropentene-1; it was identified as this compound by zinc dust reduction to n-valeraldehyde; 2,4-dinitrophenylhydrazone, M. P. 103–105° C.

After several months' standing, the crystals of the nitrosite were transformed into the oxime of 1-nitro-2-pentanone, a viscous brown liquid, as evidenced by the infrared spectra peaks at 3.15, 3.48, 6.45, 6.85, 7.10, 7.28, 8.28, 9.18, 9.85, 10.65, 12.2 and 13.65$\mu$.

The reaction between nitric oxide and 1-pentene was rerun with nitrogen dioxide catalyst using nitric oxide pressures of 150 p. s. i. g. After removal of the nitrosite, the filtrate was steam distilled. Subsequent fractionation under reduced pressure gave a product consisting of approximately 45 percent of 1-nitro-1-pentene; 24 percent of 1-nitro-2-pentene; 8 percent of higher boilers, and 23 percent of distillation residue, consisting of polymerized and decomposed material.

The 1-nitro-1-pentene had the following properties: B. P. 66–66.5° C./11 mm., $n_D^{20}$ 1.459.
*Analysis.*—Calcd. for $C_5H_9NO_2$: C, 52.2%; H, 7.9%. Found: C, 51.8%; H, 8.1%.

A small quantity of this nitro olefin was reduced with zinc and acetic acid, and the reduction product was allowed to react with 2,4-dinitrophenylhydrazine. A 2,4-dinitrophenylhydrazone identical with that from n-valeraldehyde was obtained; M. P. 105–106° C.
*Analysis.*—Calcd. for $C_{11}H_{14}N_4O_4$: C, 49.6%; H, 5.3%. Found: C, 49.9%; H, 5.6%.

The crude 1-nitro-2-pentene had a boiling point of about 60° C./10 mm., and $n_D^{20}$ 1.445. Its infrared spectrum confirmed that it was an unconjugated nitro compound.

EXAMPLE 2

*The reaction of 1-butene and nitric oxide at atmospheric pressure*

In a 500 ml., 3-necked, round-bottomed flask fitted with an efficient stirrer, a gas inlet tube and a Dry Ice acetone reflux condenser, was placed 300 ml. of carbon tetrachloride. To this, 25 grams (0.5 mole) of 1-butene was added over a period of 30 minutes by vapor transfer. The 1-butene dissolved readily in the carbon tetrachloride. Over a period of 4 hours, 65 grams of nitric oxide, containing trace amounts of nitrogen dioxide, was added with vigorous stirring. At the end of this time, a white solid was obtained which was removed by filtration, yielding 14.6 grams of dimeric 1-nitro-2-nitrosobutane, M. P. 114° C. Distillation of the carbon tetrachloride solution yielded 7.3 grams of 1-nitro-1-butene, B. P. 64° C. at 19 mm.; $n_D^{20}$ 1.4541. Schmidt, Ber., 61, 2147 (1928) reported B. P. 55° C./12 mm., $n_D^{20}$ 1.4532. The yield of nitrated products was 28% based on nitric oxide introduced.

EXAMPLE 3

*The reaction of 1-butene and nitric oxide in long columnar reactor*

A reaction similar to Example 2 utilizing a long columnar reactor, equipped with a spinning stirrer, yielded 8.7 grams of the nitrosite and 7.7 grams of the nitrobutene after 30 grams of nitric oxide had been introduced over a period of 1½ hours. This represents a yield of 38%.

Solution in carbon tetrachloride in accordance with Examples 2 and 3 will also produce reactions between nitric oxide and the following compounds to form mononitro derivatives: 1-cetene, cyclohexene, diisobutylene, triisobutylene, and trichloroethylene.

It will be obvious to those skilled in the art that it is possible to use solvents other than carbon tetrachloride in the reactions of the type described in Examples 2 and 3. While higher boiling solvents may be used, it is preferred that solvents having a boiling point less than 80° C. be used. The use of the lower boiling solvents aids in the removal of the heat of reaction and in the recovery of the reaction products. Examples of other solvents include saturated hydrocarbons such as propane, butane, pentane, hexane, and cyclohexane, aromatic hydrocarbons such as benzene and mixtures of these hydrocarbons. It will be seen in later examples in this application that these saturated and aromatic hydrocarbons also react with nitric oxide when a catalytic quantity of a substance which will yield nitrogen dioxide in an atmosphere of nitric oxide is present. The rate of reaction between nitric oxide and olefins under the conditions of Examples 2 and 3 is so much greater than that exhibited by the saturated hydrocarbons or aromatic hydrocarbons under similar conditions that substantially all the nitric oxide reacts only with the olefin. Thus, the selective reaction between the olefins and nitric oxide enables the saturated hydrocarbons and aromatic hydrocarbons to be employed as solvents in reactions involving olefins.

EXAMPLE 4

The reaction of 2-methyl-2-butene with nitric oxide

About 80 cc. of 2-methyl-2-butene (99 mole percent) was placed in a glass lined autoclave and the autoclave was flushed with high pressure nitrogen. Nitric oxide containing about 0.1% by weight of nitrogen trioxide was added slowly and immediate reaction took place. The rocking mechanism was started, and nitric oxide was added to 200 p. s. i. g. at intervals of five minutes for a period of about two hours. After every fourth addition, the reaction gases were bled off while the rocking mechanism was stopped. At the completion of the two hour reaction period a single phase liquid product possessing very deep green color was obtained. Distillation of a sample of the reaction product gave a number of fractions. One of these distilled with an intense blue color and solidified to a white solid (B. P. 36–42° C. at 2 mm.). This solid product (the nitrosite of 2-methyl-2-butene) was washed with ether and alcohol; M. P. 74–75° C.

Infrared spectra of the more volatile portions of the distillate showed that the following nitro olefins were present: (1) An unidentified noconjugated nitro olefin; B. P. 45° C./10 mm., $n_D^{20}$ 1.4350. Absorption peaks: 3.40, 6.12, 6.44, 6.90, 7.23, 7.35, 7.80, 8.92, 9.24, 9.77, 10.08, 10.92, 11.57, and 13.18$\mu$. (2) A nonconjugated nitro olefin, identical with that prepared from nitromethane and methyl ethyl ketone by the process of Lambert and Lowe reported in J. Chem. Soc., 1947, 1519. These authors reported that the structure of this nitro olefin was 1-nitro-2-methyl-1-butene. However, we have found that this compound (B. P. 56.5–57.5° C./9.5 mm., $n_D^{20}$ 1.4473) is actually 1-nitro-2-methyl-2-butene, as evidenced by absorption peaks at 3.44, 3.52, 6.00, 6.45, 7.00, 7.27, 7.64, 8.35, 9.12, 9.55, 10.35, 10.63, 11.23, 11.88, 12.52 and 13.70$\mu$. Upon ozonolysis of this compound acetaldehyde was formed; dimedon derivative M. P. 138–139° C. (3) A trace of a conjugated nitro olefin having an infrared peak at 6.60$\mu$.

EXAMPLE 5

Vapor phase reaction of isobutylene (2-methylpropene) and nitric oxide

Nitric oxide and isobutylene were passed, at rates of 50 and 150 ml./min. respectively, through a tubular reactor. The reactor was about 5 ft. long, had a volume of 750 ml. and was maintained at about 50° C. Several 2 milligram portions of nitrogen dioxide were added to the gas stream to catalyze the reaction. After each addition of nitrogen dioxide, a reaction, evidenced by the formation of drops of liquid on the walls of the reactor, would commence and continue for a few minutes, but then would either stop or continue at only a very slow rate until another portion of the catalyst was added. After 40 minutes, 5 ml. of a greenish liquid collected at the bottom of the reactor. This liquid product was washed with water, and distilled to give 70% crude nitroisobutylenes, B. P. 55–95° C./21 mm.; $n_D^{20}$ 1.4540; 12% of an intermediate boiling fraction (B. P.<85° C./1 mm., $n_D^{20}$ 1.4600) consisting mainly of nitro-tert-butanol and nitro-tert-butyl nitrate; and 18% of a non-volatile residue.

EXAMPLE 6

The reaction of tetramethylethylene with nitric oxide

About 80 ml. of freshly distilled tetramethylethylene was placed in the glass-lined autoclave. The autoclave was flushed three times with high-pressure nitrogen. Nitric oxide containing a trace of nitrogen tetroxide was added to a pressure of 100 p. s. i. g. The reaction took place immediately. Nitric oxide was added over a period of two hours using the same procedure outlined for 2-methyl-2-butene. The reaction product was a deep green one-phase liquid. After standing in a refrigerator for several hours, a white crystalline solid separated and was shown to be 2,3-dimethyl-2,3-dinitrobutane, M. P. 208–209° C., mixed M. P. 208–209° C. Distillation of the liquid reaction product gave 2,3-dimethyl-3-nitro-1-butene; B. P. 70.8° C./10 mm., $n_D^{20}$ 1.4564.

*Analysis.*—Calc'd for $C_6H_{11}NO_2$: C, 55.79%; H, 8.59%; N, 10.85%. Found: C, 54.7%; H, 8.4%; N, 11.3%.

Further proof of structure was obtained from the infrared spectrum showing that the compound was a nonconjugated nitro olefin. Its insolubility in aqueous alkali showed that it contained a tertiary nitro group. Ozonolysis gave a volatile aldehyde, different from any of the simple $C_1$–$C_5$ aldehydes; dimedon derivative, M. P. 128–129° C.

*Analysis.*—Found: C, 47.8%; H, 6.2%.

Steam distillation of the non-volatile ozonide in the presence of zinc dust gave an oil that formed a 2,4-dinitrophenylhydrazone, M. P. 119° C. It is possible that this was the 2,4-dinitrophenylhydrazone of 2-nitro-2-methyl-butanone-3.

*Analysis.*—Calc'd for $C_{11}H_{13}N_5O_6$: C, 42.7%; H, 4.2%; N, 22.5%. Found: C, 43.6%; H, 4.2%; N, 22.8%.

No nitrosite was isolated in this experiment, but its presence was suggested by the blue to green color of the reaction product.

EXAMPLE 7

Reaction of 1-pentene and nitric oxide at sub-atmospheric pressure

A mixture of 1-pentene (215 mm. partial pressure) and nitric oxide containing a trace of nitrogen dioxide (541 mm. partial pressure) was placed in a glass bulb of 185 ml. volume and maintained at 35° C. The bulb was connected to a manometer. Reaction, evidenced by formation of liquid droplets on the walls of the bulb and a drop in the gas pressure inside the bulb, started immediately. The pressure dropped from 756 mm. to about 470 mm. in one hour, and to 280 mm. (reaction about 90% complete) after 12 hours. The liquid products of several such runs were distilled, and the distillate and residual fractions subjected to infrared spectra analysis. The results showed that the original reaction products consisted of about 11% 1-nitro-2-pentanol, 12% 1-nitro-2-pentyl nitrate, 10% 1,2-dinitropentane, 17% 1-nitro-2-pentene, and 50% 1-nitro-1-pentene.

In Example 7, 1,3-butadiene; isobutylene; 2-methyl-butene-2; 2,3-dimethylbutene-2; trichloroethylene; and ethylene may be substituted for 1-pentene.

EXAMPLE 8

The reaction of 2,3-dimethyl-1-butene with nitric oxide

About 20 ml. of 2,3-dimethyl-1-butene was placed in the glass-lined autoclave. The autoclave was flushed three times with high-pressure nitrogen. Nitric oxide containing 0.2% by weight of nitrogen dioxide was added to 100 p. s. i. g. and an immediate reaction took place. The nitric oxide additions were continued over a period of one and one-half hours, in the manner described for 2-methyl-2-butene. A dark green liquid product was obtained. The product was steam distilled and subsequent rectification yielded a distillate that contained 61 percent of 1-nitro-2,3-dimethyl-1-butene, 25 percent of 1-nitro-2,3-dimethyl-2-butene, and 14 percent of unidentified products.

The 1-nitro-2,3-dimethyl-1-butene, B. P. 76–76.2° C./ 10 mm., $n_D^{20}$ 1.4680, was identified by its infrared spectrum, with absorption peaks at 3.46, 6.11, 6.62, 6.83, 7.45, 7.65, 8.32, 9.16, 10.57, 11.36, 12.08, 13.40, and 13.70 which showed it to be a conjugated nitro olefin, and by its ozonolysis to methyl isopropyl ketone; 2,4-dinitrophenylhydrazone, M. P. 117–118° C., mixed M. P. with authentic specimen 117–118° C.

*Analysis.*—Calcd. for $C_6H_{11}NO_2$: C, 55.79%; H, 8.59%. Found: C, 54.8%; H, 8.4%.

The 1-nitro-2,3-dimethyl-2-butene, B. P. 63–67° C./10 mm., $n_D^{20}$ 1.4444, was identified by its infrared spectrum, which had absorption peaks at 3.46, 6.10, 6.46, 6.84, 7.32, 8.35, 9.10, 10.85, 12.65, 13.45$\mu$, which showed it to be a non-conjugated nitro olefin, and by its ozonolysis to acetone; 2,4-dinitropheneylhydrazone, M. P. 125° C.

*Analysis.*—Calcd. for $C_6H_{11}NO_2$: C, 55.79%, H, 8.59%; N, 10.85%. Found: C, 56.2%; H, 9.0%; N, 10.8%.

EXAMPLE 9

The reaction of cyclohexene with nitric oxide

Approximately 80 ml. of cyclohexene was placed in the glass-lined autoclave. The autoclave was flushed three times with high-pressure nitrogen. Nitric oxide containing about 0.001% by weight of nitrogen trioxide, $N_2O_3$ was added as described for 2-methyl-2-butene in Example 4. After a two and one-half hour reaction period, the products were removed from the autoclave. It was observed that a considerable amount of crystalline material had formed. This product was placed in the refrigerator for several days; the crystalline product was separated by filtration and the filtrate steam distilled. The organic layer from the steam distillate was rectified in a small column and found to contain 1-nitrocyclohexene and 3-nitrocyclohexene in a 3:2 ratio. The crystalline compound was recrystallized from benzene and ethyl alcohol and was found to be cyclohexene nitrosite, M. P. 151–151.5° C. (dec.).

The 1-nitrocyclohexene was purified by repeated fractionation and obtained as a yellow oil having the characteristic infrared spectrum and the odor of a conjugated nitro olefin; its absorption peaks occurred at 3.48, 6.02, 6.62, 6.90, 6.97, 7.47, 9.23, 9.45, 10.82, 12.17 12.48, 13.60, 14.43$\mu$, B. P. 96.3° C./10 mm., $n_D^{20}$ 1.5048.

*Analysis.*—Calcd. for $C_6H_9NO_2$: C, 56.68%; H, 7.13%; N, 11.02%. Found: C, 56.3%; H, 7.24%; N, 11.23%.

The 3-nitrocyclohexene was obtained free of the conjugated isomer by intimate agitation for two hours with sodium bisulfite. The infrared spectrum showed it to be a non-conjugated nitro compound. Absorption peaks occurred at 3.35, 3.48, 6.47, 6.90, 7.28, 9.70, 10.42, 11.12, 12.03, 12.90, 13.30$\mu$, B. P. 84° C./10 mm., $n_D^{20}$ 1.4792.

*Analysis.*—Calcd. for $C_6H_9NO_2$: C, 56.68%; H, 7.13%; N, 11.02%. Found: C, 56.84%; H, 7.33%; N, 11.26%.

EXAMPLE 10

The reaction of α-methylstyrene with nitric oxide

Nitric oxide containing about 0.05% by weight of nitric acid was bubbled through 4.5 grams of 2-methylstyrene at a rate of about 20 ml./min. for three hours. The resulting green liquid was steam distilled and fractionated, giving 0.9 gram of α-methylstyrene, 1.29 grams of residues, and 2.23 grams of nitromethylstyrene (45 percent yield, based on unrecovered α-methylstyrene), B. P. 104–107° C./1.4 mm., $n_D^{20}$ 1.5831, $d^{28}$ 1.12. Infrared spectra showed that this product was about 55 percent α-methyl-β-nitrostyrene and 45 percent α-(nitromethyl)styrene.

It is apparent from the foregoing examples that the reaction between olefins and nitric oxide in the presence of a catalyst constitutes a general approach to the synthesis of nitro olefins. In the foregoing in some cases the nitrogen became attached to the hydrocarbon molecule by substituting from a hydrogen atom. In other cases the nitrogen became attached through reaction with the double bond.

Nitric oxide reacts readily with various saturated hydrocarbons to produce a complex mixture of products. Generally, the reaction products consist of nitroparaffins, ketones, alcohols, nitrate esters, nitro olefins, nitro alcohols, and dinitroparaffins. When only a methyl group is available for reaction, aldehydes, nitriles and carboxylic acids may also be formed. Such compounds are useful as explosives and synthetic intermediates. The following examples will illustrate the application of our invention to saturated hydrocarbons.

EXAMPLE 11

The reaction of n-pentane with nitric oxide

Approximately 80 ml. of n-pentane (99 mole percent) was charged into a 300 ml. glass-lined autoclave equipped with a heater and rocking mechanism. After flushing the autoclave with high-pressure nitrogen, nitric oxide containing 1% by weight of nitrogen dioxide was admitted and allowed to react with the pentane at 120° C. and 150 p. s. i. g. for five hours. The excess pentane was removed by evaporation on a hot water bath and the residue, a light yellow oil, was fractionated under reduced pressure. Several fractions were separated.

2-nitropentane was present to the extent of 43% by volume. Acidic hydrolysis and treatment with 2,4-dinitrophenylhydrazine, gave the 2,4-dinitrophenylhydrazone of 2-pentanone, M. P. 140–141° C. An authentic specimen of 2-pentanone-2,4-dinitrophenylhydrazone melted at 140–143.5° C., mixed melting point, 140–143.5° C.

The presence of 2-pentanone to the extent of about 10% was confirmed by the preparation of a 2,4-dinitrophenylhydrazone, which melted at 132–136° C. after two recrystallizations from alcohol. An authentic specimen of 2-pentanone-2,4-dinitrophenylhydrazone melted at 136–139° C. at a similar stage in its purification.

Amyl nitrates, principally 2-pentyl nitrate, were present to the extent of 6% as shown by the very strong characteristic nitrate ester bands at 6.11, 7.80, and 11.50$\mu$ in the infrared spectrum of the reaction product.

Pentanols were present in the reaction product to the extent of 2% as evidenced by the presence of the bands of an alcohol in the infrared spectra of the lower boiling fractions of the product.

EXAMPLE 12

The reaction of n-pentane with nitric oxide at room temperature

Approximately 80 grams of n-pentane (99 mole percent) was charged into the glass-lined autoclave. The autoclave was then flushed three times with high-pressure nitrogen. Nitric oxide containing about 0.05% by weight of nitrous acid was added to 200 p. s. i. g. and the reaction mixture was allowed to stand for four days at room temperature, after which time it was noted that the pressure had dropped to 100 p. s. i. g. More nitric oxide was added without venting, bringing the pressure to 200 p. s. i. g. After a total reaction period of one week, the autoclave was vented, and the product removed. After the excess n-pentane had been removed, approximately 0.5 ml. of an oily residue remained. Distillation of this oil gave 0.1 ml. of a light oily liquid which gave an intense blue color with sulfuric acid-diphenylamine reagent, indicating the presence of oxidized nitrogen. Infrared analysis showed that 2-nitropentane and 2-pentanol were present, together with lesser amounts of carbonyl compounds and nitrate esters.

EXAMPLE 13

The reaction of cyclohexane with nitric oxide

About 80 grams of cyclohexane (cyclohexene free) was charged into the glass-lined autoclave and flushed three times with high pressure nitrogen. The autoclave was pressurized to 200 p. s. i. g. with nitric oxide containing about 0.02% by weight of nitric acid. The reaction mixture was heated at 120° C. for six hours with the autoclave rocking. After cooling, a pressure drop of 75 p. s. i. g. was noted. The reaction product was fractionated under reduced pressure.

Cyclohexanol, cyclohexanone, cyclohexyl, nitrate, nitrocyclohexane, 1-nitrocyclohexene, and 1,1-dinitrocyclohexane were identified in the reaction product.

EXAMPLE 14

*The reaction of isopentane with nitric oxide*

Approximately 80 ml. of isopentane was charged into the glass-lined autoclave. The autoclave was pressurized and flushed three times with high-pressure nitrogen. Nitric oxide containing 2% by weight of nitrogen dioxide was added to a total pressure of 200 p. s. i. g. The rocking mechanism was started, and it was noted that the pressure dropped about 50 p. s. i. g. More nitric oxide was added to bring it back to 200 p. s. i. g. The reaction mixture was heated with shaking at 120° C. for seven hours.

The reaction product was fractionated under reduced pressure. Nitromethane, t-amyl alcohol, and 1-nitro-2-methylbutanol-2 were identified in the reaction product by comparison of the infrared spectra of the various fractions of the product with those of the pure compounds. Absorption peaks for 1-nitro-2-methylbutanol-2 occurred at 2.92, 3.45, 3.52, 6.47, 6.85, 7.26, 8.18, 8.75, 9.45, 9.8, 10.75, 11.27, 12.48 and 13.75$\mu$.

t-Nitropentane (2-nitro-2-methylbutane) was isolated by washing the second fraction of the distillate with strong alkali, drying the product over calcium chloride, and then redistilling to get the pure nitro compound as a colorless liquid with a mild odor, B. P. 149.5° C./754 mm.; $n_D^{20}$ 1.4143, F. P. —38° C. The yield of this product from all fractions was 34% by volume.

*Analysis.*—calcd. for $C_5H_{11}NO_2$: C, 51.3%; H, 9.4%; N, 12.0%. Found: C, 51.1%; H, 9.3%; N, 12.5%.

1-nitro-2-methylbutene-1 was isolated in 19% yield by refractionation. The compound was a yellow liquid with a sharp odor, B. P. 68–70° C./10 mm., $n_D^{20}$ 1.4650. The structural assignment is based on the following reasoning: (1) The analysis indicated that its empirical formula was $C_5H_9NO_2$. (2) The infrared peaks occurring at 3.27, 3.44, 3.55, 6.10, 6.87, 7.45, 8.42, 9.31, 9.88, 10.52, 10.78, 12.03, 13.3$\mu$, the ultraviolet maximum occurring at 265$\mu$, the yellow color, sharp odor, and high values of the refractive index and boiling point suggested that it was a conjugated nitro olefin. (3) Upon acidic hydrolysis, there was formed methyl ethyl ketone, identified by its 2,4-dinitrophenylhydrazone, M. P. 110.5–112.5° C., which did not depress the melting point of an authentic specimen. (4) The compound reported in the literature (J. Chem. Soc. 1947, 1519) to be 1-nitro-2-methylbutene-1, which is different from this compound, has been shown to be actually 1-nitro-2-methylbutene-2.

In Examples 11 to 14, a large excess of the hydrocarbon was always employed so that the extent of the conversion to products was small. Therefore, it was of interest to carry out the reaction with one of the hydrocarbons to a greater over-all conversion in order to see whether this would alter the composition of the final product. This was done in Example 15.

EXAMPLE 15

*The reaction of isopentane with three successive charges of nitric oxide*

About 80 ml. of isopentane (99+ mole percent) was charged into the glass-lined autoclave. The autoclave was flushed three times with high-pressure nitrogen. Nitric oxide containing 2% by weight of nitrogen dioxide was then added to 250 p. s. i. g. and the mixture was heated with rocking at 120° C. (about 310 p. s. i. g.) for thirteen hours. After this reaction period the autoclave was allowed to return to room temperature, and the pressure was noted to be 150 p. s. i. g. The reaction gases were bled off; the autoclave was repressurized with NO containing nitrogen dioxide to 250 p. s. i. g.; and the mixture reheated at 120° for eleven hours. The autoclave was allowed to cool to room temperature, and it was noted that the pressure was 150 p. s. i. g. again. After reventing and pressurizing again to 250 p. s. i. g. with nitric oxide, the mixture was heated for thirteen hours at 120° C. At the end of this heating period, the autoclave was allowed to cool to room temperature, and the reaction product was fractionated under reduced pressure. The composition of the product obtained in this manner, compared with that obtained from one charge of nitric oxide, is shown in Table I. The yields of t-nitropentane and the nitro alcohol from this run are based upon distillation data.

TABLE I.—EFFECT OF INCREASING THE AMOUNT OF NITRIC OXIDE ADDED TO 80 ml. OF ISOPENTANE

Addition of NO at 250 p. s. i. g. to Isopentane at 120° C.[a]

| Total Yield Composition ([a]) | One Addition of NO 2.62 ml. (percent) | Three Successive Additions of NO 6.30 ml. (percent) |
|---|---|---|
| Nitromethane | 0.1 | 0.5 |
| Unidentified ketone | 4 | 1.5 |
| t-Amyl alcohol | 5 | 7 |
| t-Nitro pentane | 34 | 50 |
| Unidentified carbonyl compound | 1 | 3.5 |
| 1-Nitro-2-methylbutene-1 | 19 | 20 |
| 1-Nitro-2-methylbutanol-2 | 17 | 11 |
| Unidentified nitro compound | 16 | 1 |
| Residue and holdup | 4 | 5.5 |

[a] Percent by volume.

EXAMPLE 16

*The reaction of toluene with nitric oxide*

About 80 ml. of C. P. toluene was placed in the glass-lined autoclave. The autoclave was then flushed three times with high-pressure nitrogen and pressurized with nitric oxide containing a trace of nitrogen dioxide to 200 p. s. i. g. The rocking mechanism was started and after a few minutes was shut off. The pressure of the nitric oxide was then readjusted to 200 p. s. i. g. by adding nitric oxide. The heater and rocker were turned on again, and the reaction mixture was brought to 120° C. and kept at this temperature for about seven hours. When the reaction product was removed from the autoclave, the odor of benzaldehyde was noted.

The reaction product was fractionated under reduced pressure. Some decomposition, evidenced by the evolution of nitrogen dioxide and water, occurred during the distillation so that the composition of the fractionated product was somewhat different from that of the crude product.

Phenylnitromethane was present to the extent of 35% by volume of the reaction products. It is a pale yellow oil, B. P. 109° C./10.5 mm., $n_D^{20}$ 1.5332.

*Analysis.*—Calcd. for $C_7H_7NO_2$: C, 61.3%; H, 5.1%; N, 10.2%. Found: C, 62.3%; H, 5.4%; N, 10.6%.

Benzaldehyde, benzonitrile, and benzyl alcohol were present in the reaction product to the extent of 16%, 2% and 5%, respectively. Benzaldehyde was also obtained by redistillation of the lowest boiling fractions of the reaction product as a colorless oil, B. P. 63° C./11 mm., $n_D^{20}$ 1.5400. Benzyl nitrate was obtained in 11% yield and identified by its infrared absorption spectrum which had peaks occurring at 6.12, 7.81, 10.27, 11.02, 11.63, 13.20, 14.35, 14.60$\mu$.

Benzoic acid was obtained in an 8% yield. It was purified by recrystallization from hot water. White crystals, M. P. 122° C.; neutral equivalent 127.

EXAMPLE 17

The reaction of ethylbenzene with nitric oxide

About 80 ml. of ethylbenzene was placed in a glass-lined autoclave. The autoclave was flushed three times with high-pressure nitrogen, after which time nitric oxide containing 1.0% nitrogen dioxide was added to 250 p. s. i. g. The heater and rocker were started. At approximateily 83° C. the reaction became quite exothermic. The reaction mixture was allowed to cool to room temperature. The product had a light yellow color.

α-Phenylnitroethane, present to the extent of 37% by volume, was obtained as a pale yellow oil, B. P. 113.5° C./10.5 mm., $n_D^{20}$ 1.5237; M. P. 9.5–10.5° C.

*Analysis.*—Calcd. for $C_8H_9NO_2$: C, 63.5%; H, 6.0%; N, 9.3%. Found: C, 64.3%; H, 6.4%; N, 9.3%.

β-Nitrostyrene obtained was yellow crystals, recrystallized from hexane, M. P. 57.0–57.5° C., yield 24%.

Acetophenone and methylphenylcarbinol, present to the extent of 18% and 5%, respectively, were identified in the reaction product by comparison of the infrared spectra of the product fractions with those of the pure compounds.

EXAMPLE 18

The reaction of cumene (isopropylbenzene) with nitric oxide

About 80 ml. of 99 mol percent cumene was charged into the glass-lined autoclave. The autoclave was flushed out three times with high-pressure nitrogen. Nitric oxide containing a trace of nitrogen pentoxide was added to a total pressure of 250 p. s. i. g. The heater and rocking mechanism were turned on. When the rocker started, the pressure dropped to about 230 p. s. i. g. At about 80–85° C., the reaction became exothermic. When the products were allowed to cool to 40° C., the pressure had dropped to 140 p. s. i. g. The reaction product was fractionated under reduced pressure.

Acetophenone, 2-phenyl-2-propanol, α-(nitromethyl)-styrene, and α-methyl-β-nitrostyrene, present respectively to the extent of 15%, 6%, 13% and 9% were identified in the reaction product by comparison of the infrared spectra of the various fractions of the product with those of the pure compounds. α-(Nitromethyl)-styrene and α-methyl-β-nitrostyrene were not available in a pure form but two mixtures containing the two in different proportions were available from the reaction product of α-methylstyrene and nitric oxide; and the spectra of these mixtures were used for the above comparisons.

2-phenyl-2-nitropropane was present to the extent of 12% and was identified as an alkali-insoluble tertiary nitro compound, whose infrared spectrum, with peaks at 3.32, 3.46, 6.47, 6.65, 6.79, 6.88, 7.15, 7.28, 7.40, 8.33, 8.72, 8.94, 9.25, 9.68, 10.95, 11.75, 13.12, 13.94 and 14.4μ, showed that the nitro group was unconjugated. The spectrum as a whole was very similar to those of phenylnitromethane and α-phenylnitroethane.

1-nitro-2-phenyl-2-propanol which was present to the extent of 17% by volume, was identified by the fact that its infrared spectrum with peaks at 2.81, 6.42, 7.24 showed both unconjugated nitro and hydroxyl groups to be present and that, upon treatment with alkali, it was cleaved to produce acetophenone, identified by its infrared spectrum.

EXAMPLE 19

The reaction of t-butylbenzene and nitric oxide

Approximately 80 ml. of t-butylbenzene (99+ percent) was charged into the glass-lined autoclave. The autoclave was pressurized three times with high-pressure nitrogen. The autoclave was then pressurized with nitric oxide containing 0.05% nitrogen tetroxide to 200 p. s. i. g. The rocker was started, and after a few minutes more nitric oxide was added to give a total pressure of 200 p. s. i. g. The heater was started, and the temperature was maintained at 210° F. for six hours. The crude reaction product was a light yellow liquid from which a small amount of water separated upon cooling. The separation of water was also observed with the other saturated hydrocarbon nitric oxide reaction products. The reaction product was extracted with an aqueous solution of sodium bicarbonate. The resulting brown aqueous solution was acidified with nitric acid, extracted with ether, and the ether was evaporated to leave about 0.15 ml. of a very viscous clear brown liquid, which seemed to solidify, but not crystallize, on standing. It had an odor that recalled that of phenylacetic acid. The bicarbonate-insoluble portion of the reaction product was fractionated under reduced pressure.

Infrared spectra of the various fractions of the distillate showed that in the reaction product there was a very complex mixture of compounds, many of which represented types not found in the other hydrocarbon-nitric oxide reaction products. β-nitro-t-butylbenzene was present to the extent of 8%. Dimethylphenylacetonitrile, present in the reaction product to the extent of 10%, was identified by comparing the infrared spectra with that of the pure compound. Acetophenone was present to the extent of 3%.

Unidentified nitro compounds constituted the bulk of the product; unidentified types of compounds, represented by infrared peaks at 4.69, 5.40, 5.58, 5.62, 5.77 and 5.87 were present also.

The highest boiling fraction consisted largely of poly-substituted derivatives. The formation of poly-substituted derivatives, as well as that of acetophenone, strongly indicates that rearrangement of the carbon skeleton of the t-butylbenzene occurred during this reaction.

The former examples illustrate the application of our invention to saturated hydrocarbons and hydrocarbons containing double bonds.

The ease with which olefins, alkanes and cycloalkanes, acetylene, and alkylbenzenes react with nitric oxide, when catalyzed with an oxide of nitrogen, a nitrogen oxy-acid or a nitrosyl halide has been described in the previous examples. In addition to these reactions it has been found that purely aromatic hydrocarbons also react with nitric oxide but at a much slower rate, even when catalyzed, than do the aliphatic hydrocarbons under similar conditions. Example 20 shows the application of our invention to an aromatic hydrocarbon, benzene.

EXAMPLE 20

The reaction of benzene with nitric oxide

Approximately 80 ml. of thiophene-free benzene was charged into the glass-lined autoclave. The autoclave was flushed three times with high-pressure nitrogen and was then pressurized with nitric oxide containing a trace of nitrogen dioxide to 200 p. s. i. g. After rocking the mixture for several minutes, the nitric oxide pressure was readjusted to 200 p. s. i. g. The reaction was carried out at 120° C. for six and one-half hours. After cooling, it was noted that the pressure had dropped about 10–15 p. s. i. g. The product was a greenish-colored liquid, which was extracted with aqueous alkali. Acidification of this extract gave an amorphous brown precipitate. Quinone and its oximes behave in a similar manner. Distillation of the benzene solution gave about 0.15 ml. of distillate, B. P. ca. 100–110 C./11 mm., $n_D^{20}$ 1.4712, and 0.15 ml. of a residue. An infrared spectrum of the distillate showed that nitrobenzene was present. The predominant products, however, were those formed from the cyclo hexane impurity.

On standing, the distillation residue deposited a small amount of a crystalline solid, M. P. 112° C., which gave a yellow solution in alkali and appeared to be p-nitrophenol.

From the foregoing examples it will be noted that the nitration reactions of the invention may be carried out (1) in solution (Examples 2a and 3), (2) dynamic vapor phase (Example 5) and (3) static vapor phase (Example 7).

While the present invention has been described with reference to particular embodiments thereof, it will be understood that numerous modifications may be made by those skilled in the art without actually departing from the invention. Therefore, we aim in the appended claims to cover all such equivalent variations as come within the true spirit and scope of the foregoing disclosure.

What we claim as new and desire to secure by Letters Patent of the United States is:

1. The method of forming substantial amounts of mononitro derivatives of a hydrocarbon compound containing olefinic unsaturation which consists essentially of contacting said hydrocarbon compound with nitric oxide in the presence of a trace up to 2 percent, by weight, of nitrogen dioxide.

2. The method of forming substantial amounts of mononitro derivatives of hydrocarbon compounds containing olefinic unsaturation which method consists essentially of contacting said hydrocarbon compounds with nitric oxide in the presence of from a trace up to about 2 percent, by weight, of an oxide of nitrogen selected from the class consisting of nitrogen dioxide, nitrogen trioxide, nitrogen tetroxide, and nitrogen pentoxide.

3. The method of forming substantial amounts of a mononitro derivative of an olefin which method consists essentially of contacting said olefin with nitric oxide in the presence of from a trace up to about 2 percent, by weight, of an oxide of nitrogen selected from the class consisting of nitrogen dioxide, nitrogen trioxide, nitrogen tetroxide, and nitrogen pentoxide.

4. The method of forming a substantial amount of a mononitro derivative of an olefin which method consists essentially of contacting an olefin in the liquid phase with nitric oxide in the presence of from a trace up to about 2 percent, by weight, of nitrogen dioxide.

5. The method of forming a substantial amount of a mononitro derivative of butylene which consists essentially of contacting butylene with nitric oxide in the presence of from a trace up to about 2 percent, by weight, of nitrogen dioxide.

6. The method of forming substantial amounts of a mononitro derivative of styrene which consists essentially of contacting styrene with nitric oxide in the presence of from a trace up to about 2 percent, by weight, of nitrogen dioxide.

7. The method of forming a substantial amount of a mononitro derivative of cyclohexene which consists essentially of contacting cyclohexene with nitric oxide in the presence of from a trace up to about 2 percent, by weight, of nitrogen dioxide.

8. The method of forming a substantial amount of a mononitro derivative of isobutylene which consists essentially of contacting said isobutylene with nitric oxide in the presence of from a trace up to about 2 percent, by weight, on nitrogen dioxide.

9. The method of forming a substantial amount of a mononitro derivative of 2-methyl-2-butene which consists essentially of contacting said 2-methyl-2-butene with nitric oxide in the presence of from a trace up to about 2 percent, by weight, of nitrogen dioxide.

References Cited in the file of this patent

UNITED STATES PATENTS 2,656,395 Benson ---------------- Oct. 20, 1953

FOREIGN PATENTS 609,022 Great Britain ---------- Sept. 23, 1948

OTHER REFERENCES

J. Org. Chem. (Michael et al.), vol. 4, 1939, p. 172.